United States Patent
Sakamoto

(10) Patent No.: US 7,777,993 B2
(45) Date of Patent: Aug. 17, 2010

(54) WIPER CONTROL CIRCUIT

(75) Inventor: Kazunori Sakamoto, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 151 days.

(21) Appl. No.: 12/225,131

(22) PCT Filed: Oct. 5, 2007

(86) PCT No.: PCT/JP2007/069558

§ 371 (c)(1),
(2), (4) Date: Sep. 15, 2008

(87) PCT Pub. No.: WO2008/084577

PCT Pub. Date: Jul. 17, 2008

(65) Prior Publication Data

US 2009/0206659 A1    Aug. 20, 2009

(30) Foreign Application Priority Data

Oct. 1, 2007   (JP)   ............... 2007-002638

(51) Int. Cl.
*H02P 1/04* (2006.01)
(52) U.S. Cl. ............... 361/33; 318/444; 318/443; 318/483; 318/445; 318/280; 318/DIG. 2; 15/250.17
(58) Field of Classification Search ............... 318/444, 318/443, 483, 445, 280, DIG. 2; 361/33; 15/250.17
See application file for complete search history.

(56) References Cited

U.S. PATENT DOCUMENTS

| | | | | |
|---|---|---|---|---|
| 4,274,037 A * | 6/1981 | Soeda | ............... | 388/820 |
| 4,689,535 A * | 8/1987 | Tsunoda et al. | ............... | 318/443 |
| 5,030,899 A * | 7/1991 | Nishibe et al. | ............... | 318/444 |
| 5,694,011 A * | 12/1997 | Corey et al. | ............... | 318/444 |
| 5,998,883 A | 12/1999 | Yamazaki et al. | | |
| 6,023,107 A * | 2/2000 | Grass | ............... | 307/10.1 |
| 6,400,110 B1 * | 6/2002 | Yabe et al. | ............... | 318/443 |
| 6,509,706 B2 * | 1/2003 | Yabe | ............... | 318/443 |
| 6,555,980 B2 * | 4/2003 | Yabe | ............... | 318/443 |
| 6,577,091 B2 * | 6/2003 | Yabe et al. | ............... | 318/443 |
| 6,600,281 B2 * | 7/2003 | Yabe | ............... | 318/443 |
| 6,624,604 B2 * | 9/2003 | Torikoshi et al. | ............... | 318/443 |
| 7,268,508 B2 | 9/2007 | Caillaud et al. | | |

FOREIGN PATENT DOCUMENTS

| | | |
|---|---|---|
| JP | 06307316 | 1/2001 |
| JP | 2002266675 | 9/2002 |
| JP | 2004299482 | 10/2004 |

* cited by examiner

*Primary Examiner*—Rita Leykin
(74) *Attorney, Agent, or Firm*—Gerald E. Hespos; Michael J. Porco

(57) ABSTRACT

A wiper control circuit is provided for invalidating the state of a wiper operation switch to suppress unnecessary operations of a wiper in an automotive vehicle upon starting an engine using a remote control engine starter. The wiper control circuit is configured to suppress generation of a sneak current and thereby reduce the likelihood that an erroneous operation instruction is received.

13 Claims, 2 Drawing Sheets

WIPER CONTROL CIRCUIT

BACKGROUND OF THE INVENTION

1. Field of the Invention

The present invention relates to a wiper control circuit for receiving an operation instruction to a vehicle mounted device.

2. Description of the Related Art

Operation switches for operating equipment such as a wiper and headlights are provided in an automotive vehicle. It often occurs that a user turns an ignition key off to stop an engine and park the automotive vehicle with the operation keys kept on. If the user gets into the automotive vehicle and turns the ignition key on again in such a state, the wiper operates and/or the headlights are turned on according to the operation switches kept on. Particularly, if the ignition key is turned off to park the automotive vehicle on a rainy day with the wiper switch kept on and turned on again on a sunny day to operate the wiper, the rubber of the wiper may be damaged due to friction with a dry windshield or may damage the windshield.

On the other hand, remote control engine starters, with which a user can start an engine by operating operation switches having a wireless communication function at a position remote from an automotive vehicle, are being widely used. In the case of starting the engine using such a remote control engine starter, the user cannot confirm the states of operation switches for a wiper, headlights and the like before starting the engine, wherefore it more often occurs that the wiper operates and/or the headlights are turned on according to the states of the operation switches before parking.

In addition, in the case of starting the engine using the remote control engine starter, the user is often at a position remote from the automotive vehicle. Accordingly, even if the wiper operates and/or the headlights are turned on according to the states of the operation switches before parking, it takes time until the user gets into the automotive vehicle and turns these operation switches off. Thus, time during which the rubber of the wiper rubs the dry windshield as described above becomes longer to further the damage of the wiper rubber and the damage of the windshield. Further, if the headlights are on when the engine is started, an output voltage of a battery decreases, whereby the engine may not be possibly started.

Accordingly, there has been known technology for invalidating the states of operation switches such as a wiper and headlights to suppress unnecessary operations of the wiper and the headlights upon starting an engine using a remote control engine starter as disclosed in Japanese Unexamined Patent Publication No. 2002-266675.

FIG. 2 is a circuit diagram showing a wiper control circuit configured to invalidate the state of a wiper operation switch upon starting an engine using a remote control engine starter. With a wiper control circuit 101 shown in FIG. 2 are connected a battery 201, a combination switch 102 integrally including a wiper operation switch, a remote control engine starter 202 and a relay switch 103. The combination switch 102 includes a variable resistor 105 whose resistance value changes according to an instruction to set an interrupt time for causing the wiper to perform an interrupt operation, a Hi switch 106 for causing a high-speed operation of the wiper, a Lo switch 107 for causing a low-speed operation of the wiper and an INT switch 108 for causing the interrupt operation of the wiper.

A power supply voltage of 12 V is supplied from the battery 201 to the wiper control circuit 101, a control power supply voltage of 5 V supplied from a control power supply circuit 130 is supplied to a ground via a digital transistor 109, a resistor 110, the variable resistor 105 and the relay switch 103. The digital transistor 109 is constructed by integrating a transistor and a resistive element into a circuit, and a diode 111 is connected in a reverse direction between an emitter and a collector of the digital transistor 109.

A base terminal of the digital transistor 109 is connected with the ground via a diode 119 and a digital transistor 118.

The power supply voltage of 12 V supplied from the battery 201 installed in an automotive vehicle is supplied to the ground via a transistor 112, a resistor 113, a diode 114, the operation switch 108 and the relay switch 103. A resistor 115 is connected between an emitter and a base of the transistor 112, and the base of the transistor 112 is connected to the ground via a resistor 116, a diode 117 and the digital transistor 118.

A base terminal of the digital transistor 118 is connected to a signal output terminal OUT of a microcomputer 104. Thus, by outputting a control signal from the microcomputer 104 to turn the digital transistor 118 on, for example, when an ignition key is turned on or an engine is started using the remote control engine starter, the digital transistor 109 and the transistor 112 are turned on to supply the power supply voltages of 5 V and 12 V to the combination switch 102.

A connection node of the variable resistor 105 and the resistor 110 is connected to an analog input terminal AD of the microcomputer 104 via a resistor 120. The microcomputer 104 includes an AD converter so as to be able to convert a voltage inputted to the analog input terminal AD, i.e. a voltage value indicating the interrupt time of the wiper and generated according to the resistance value of the variable resistor 105 into a digital value. A noise removing capacitor 121 is attached to the analog input terminal AD.

An anode of the diode 114 is connected to a base terminal of a digital transistor 125 via a resistor 122. A voltage outputted from a collector terminal of the digital transistor 125 is inputted to a signal input terminal IN of the microcomputer 104 via a resistor 123. The collector terminal of the digital transistor 125 is connected to the ground via a resistor 124.

Thus, ON- and OFF-states of the INT switch 108 are inputted as high and low voltages to the signal input terminal IN to be detectable by the microcomputer 104. Since circuits connected to the Hi switch 106 and the Lo switch 107 are similar to a circuit 148 connected to the INT switch 108, they are not described.

A control terminal of the relay switch 103 is connected to the externally connected remote control engine starter 202. The remote control engine starter 202 is for invalidating the states of the operation switches 106, 107 and 108 to suppress an unnecessary operation of the wiper upon starting the engine by turning the relay switch 103 off.

However, in the wiper control circuit 101 shown in FIG. 2, when the relay switch 103 is turned off by the remote control engine starter 202, the power supply voltage of 12 V supplied from the battery is, for example, supplied to the control power supply circuit of a 5V system having a voltage lower than the battery voltage via the transistor 112, the resistor 113, the diode 114, the operation switch 108 in the ON-state, the variable resistor 105, the resistor 110 and the diode 111. Then, the digital transistor 125 is turned on and the microcomputer 104 recognizes the ON-state of the operation switch 108, resulting in a problem that the wiper and the headlights may be operated contrary to intention.

Further, the power supply voltage of 12 V also sneaks around to the analog input terminal AD of the microcomputer 104 via the transistor 112, the resistor 113, the diode 114, the operation switch 108 in the ON-state, the variable resistor 105 and the resistor 120. In the case where a maximum rated voltage of the analog input terminal AD is 5 V, if a voltage applied to the analog input terminal AD exceeds 5V by sneaking, there has been a problem that a malfunction such as an error in a detected voltage at unillustrated another analog input terminal provided in the microcomputer 104 may occur.

SUMMARY OF THE INVENTION

The present invention was developed in view of the above situation and an object thereof is to provide a wiper control circuit capable of suppressing the generation of a sneak current.

One aspect of the present invention is directed to a wiper control circuit, comprising: a first connection terminal for connecting one end of a variable resistor to a ground via a switching element, the other end of the variable resistor in an external circuit being connected to one end of an operation switch to be turned on and off in accordance with a specified operation instruction, wherein a resistance value of the variable resistor changes according to an instruction to sent an interrupt time for causing an interrupt operation of a wiper installed in a vehicle, a second connection terminal for the connection to the other end of the operation switch; a third connection terminal for receiving a first power supply voltage; a power supply for outputting a second power supply voltage lower than the first power supply voltage based on the first power supply voltage received by the third connection terminal; a first diode disposed between the first connection terminal and the power supply in a reverse direction when seen from the first connection terminal; a first voltage detecting portion for detecting an anode voltage of the first diode, the upper limit of whose permissible range of voltages to be detected is lower than the first power supply voltage; an operation instruction detecting voltage supplying portion for supplying the first power supply voltage received by the third connection terminal to the second connection terminal; and a second voltage detecting portion for detecting a terminal voltage of the second connection terminal.

According to the wiper control circuit with such a construction, if the switching element is turned off to invalidate the states of the variable resistor and the operation switch, the variable resistor and the operation switch are shut off from the ground by the switching element, thereby invalidating the states of the variable resistor and the operation switch. In this case, since a current path from the third connection terminal to the power supply via the operation switch and the variable resistor is shut off by the first diode, a likelihood that a sneak current flows from the third connection terminal to the power supply, a voltage generated by this sneak current is detected by the first and second voltage detecting portions and, hence, an erroneous instruction is received can be reduced.

DETAILED DESCRIPTION OF THE PREFERRED EMBODIMENTS

Figure 1:
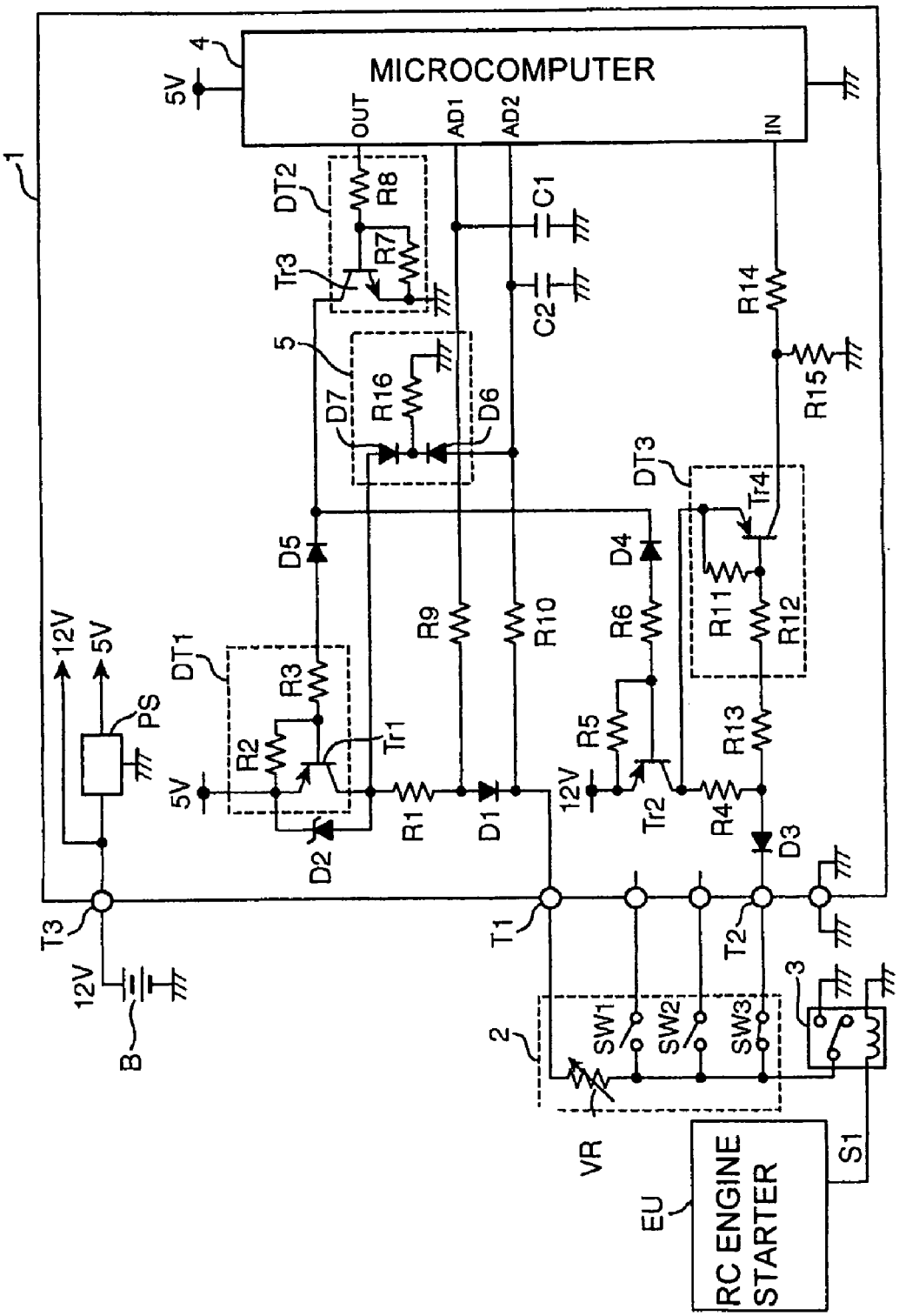
FIG. 1 is a circuit diagram showing an exemplary wiper control circuit according to one embodiment of the invention.
Figure 2:
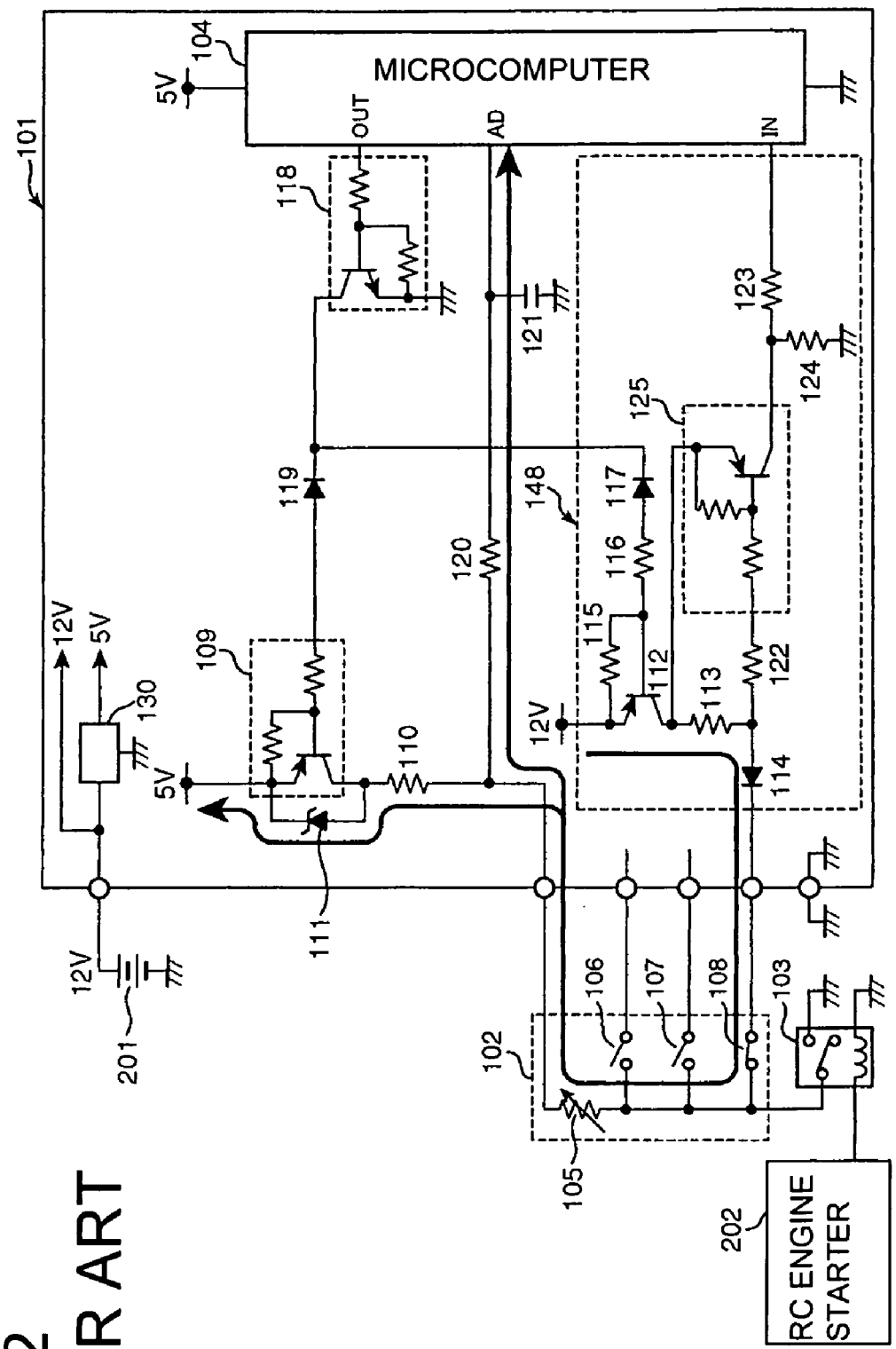
FIG. 2 is a circuit diagram of a wiper control circuit according to background art.

Hereinafter, one embodiment of the present invention is described with reference to the accompanying drawing. FIG. 1 is a circuit diagram showing an exemplary wiper control circuit according to one embodiment of the invention. A wiper control circuit 1 shown in FIG. 1 is provided with connection terminals T1, T2 and T3 (first, second and third connection terminals), a control power supply circuit PS for generating a power supply voltage (second power supply voltage) of 5 V, for example, from a power supply voltage (first power supply voltage) of 12 V received by the connection terminal T3, and a microcomputer 4 (controller). The connection terminals T1, T2 and T3 may, for example, be connectors, terminals of parts such as diodes, transistors and resistors, wiring patterns such as lands and pads, through holes of a printed wiring board or the like.

A combination switch 2 integrally including a wiper operation switch is connected to the connection terminals T1, T2, and a battery B of, e.g. 12 V installed in a vehicle is connected to the connection terminal T3.

The combination switch 2 includes a variable resistor VR whose resistance value changes according to an instruction to set an interrupt time for causing an interrupt operation of a wiper, a Hi switch SW1 for causing a high-speed operation of the wiper, a Lo switch SW2 for causing a low-speed operation of the wiper and an INT switch SW3 for causing the interrupt operation of the wiper.

A power supply voltage of 12 V is supplied from the battery B to the wiper control circuit 1, and a power supply voltage of 5 V generated from this power supply voltage of 12 V is supplied to a ground via a transistor Tr1, a resistor R1 (series resistor), a diode D1 (first diode), the connection terminal T1, the variable resistor VR and a relay switch 3 (switching element). A resistor R2 is connected between an emitter and a base of the transistor Tr1 and a resistor R3 is connected to a base of the transistor Tr1, thereby constructing a so-called digital transistor DT1. Further, a diode D2 is connected in a reverse direction between the emitter and a collector of the transistor Tr1, and the base terminal of the transistor Tr1 is connected to the ground via the resistor R3, a diode D5 and a transistor Tr3.

The power supply voltage of 12 V supplied from the battery B installed in an automotive vehicle is supplied to the ground via a transistor Tr2 (operation instruction detecting voltage supplying portion), a resistor R4, a diode D3, the connection terminal T2, the INT switch SW3 in an ON-state and the relay switch 3. A resistor R5 is connected between an emitter and a base of the transistor Tr2, and a resistor R6 is connected to the base of the transistor Tr2. The base of the transistor Tr2 is connected to the ground via a resistor R6, a diode D4 and the transistor Tr3. It should be noted that the operation instruction detecting voltage supplying portion may be wiring or the like for supplying the power supply voltage of 12 V received by the connection terminal T3 to the connection terminal T2.

The power supply voltage of 12 V is used to detect the ON- and OFF-states of the Hi switch SW1, the Lo switch SW2 and the INT switch SW3. In this case, if the power supply voltage of 5 V is used to detect the ON- and OFF-states of the Hi switch SW1, the Lo switch SW2 and the INT switch SW3, a current consumed by the 5V system increases and, hence, it is necessary to increase a current capacity of the control power supply circuit PS for supplying the power supply voltage of 5 V. This may increase the cost of the power supply circuit. However, since the wiper control circuit 1 uses the power supply voltage of 12 V supplied from the battery B or the like to detect the ON- and OFF-states of the Hi switch SW1, the Lo switch SW2 and the INT switch SW3, a likelihood of increasing the cost of the power supply circuit can be reduced.

A resistor R7 is connected between an emitter and a base of the transistor Tr3, and a resistor R8 is connected to a base of the transistor Tr3, thereby constructing a so-called digital transistor DT2. The base terminal of the transistor Tr3 is connected to a signal output terminal OUT of the microcomputer 4 via the resistor R8. Thus, when the engine is started, for example, by turning an ignition key on or using the remote control engine starter, a control signal is outputted from the microcomputer 4 to turn the transistor Tr3 on, thereby turning the transistors Tr1, Tr2 on to supply the power supply voltages 5 V and 12 V to the combination switch 2.

Further, an anode of the diode D1 is connected to an analog input terminal AD1 (first voltage detecting portion) of the microcomputer 4 via a resistor R9. A noise removing capacitor C1 is attached to the analog input terminal AD1. A cathode of the diode D1 is connected to an analog input terminal AD2 (third voltage detecting portion) of the microcomputer 4 via a resistor R10. A noise removing capacitor C2 is attached to the analog input terminal AD2.

The microcomputer 4 includes an AD converter and converts a voltage inputted to the analog input terminal AD2, i.e. a voltage value indicating the interrupt time of the wiper and generated according to the resistance value of the variable resistor VR into a digital value. The microcomputer 4 obtains a difference between the voltage inputted to the analog input value AD2 and the one inputted to the analog input terminal AD1 as a forward voltage of the diode D1. An operation power supply voltage of the microcomputer 4 is 5 V and a maximum rated voltage as an upper limit of a permissible range of voltages to be detected by the analog input terminals AD1, AD2 is 5 V+10%, i.e. about 5.5 V and lower than 12V supplied from the battery B.

The analog input terminal AD2 is connected to an anode of a diode D6 (third diode), and a cathode of the diode D6 is connected to the ground via a resistor R16 and to a cathode of a diode D7 (second diode). An anode of the diode D7 is connected to the collector of the transistor Tr1. An overvoltage protecting circuit 5 for suppressing an increase of the voltage inputted to the analog input terminal AD2 in excess of 5 V is constructed by the diodes D6, D7, a resistor R16 (first resistor) and the resistor R10 (second resistor). Resistance values of the resistors R16, R10 are set such that a voltage obtained in the case of dividing 12 V by the resistors R16, R10 is equal or below 5 V.

An emitter of a transistor Tr4 is connected to a collector of the transistor Tr2. A resistor R11 is connected between an emitter and a base of the transistor Tr4 and a resistor R12 is connected to the base of the transistor Tr4, thereby constructing a so-called digital transistor DT3. The base of the transistor Tr4 is connected to an anode of the diode D3 via resistors R12, R13.

The voltage outputted from a collector of the transistor Tr4 is inputted to a signal input terminal IN (second voltage detecting portion) of the microcomputer 4 via a resistor R14. The collector terminal of the transistor Tr4 is connected to the ground via a resistor R15.

In this way, the ON- and OFF-states of the INT switch SW3 are inputted as high and low voltages to the signal input terminal IN to be detectable by the microcomputer 4. Since circuits connected to the Hi switch SW1 and the Lo switch SW2 are similar to a circuit connected to the INT switch SW3, they are not described.

A control terminal of the relay switch 3 is connected to an externally connected remote control engine starter EU (engine starting device). The remote control engine starter EU invalidates the states of the Hi switch SW1, the Lo switch SW2 and the INT switch SW3 to suppress unnecessary operations of the wiper and headlights upon starting the engine by turning the relay switch 3 off.

In the wiper control circuit 1 constructed as described above, even if the relay switch 3 is turned off by the remote control engine starter EU upon starting the engine, the power supply voltage of 12 V supplied from the battery B is, for example, applied to the cathode of the diode D1 via the transistor Tr2, the resistor R4, the diode D3, the INT switch SW3 in the ON-state and the variable resistor VR.

However, since the flow of a sneak current to the control power supply circuit PS of the 5V system is hindered by the diode D1, it can be suppressed that the transistor Tr4 is turned on by the sneak current to apply a high-level voltage to the signal input terminal IN of the microcomputer 4 and the microcomputer 4 erroneously recognizes the INT switch SW3 as being in the ON-state.

Further, since the application of the sneak current via the transistor Tr2, the resistor R4, the diode D3, the INT switch SW3 in the ON-state and the variable resistor VR to the analog input terminal AD1 is hindered by the diode D1, the application of a voltage exceeding the maximum rated voltage to the analog input terminal AD1 is suppressed, with the result that a malfunction such as an error in a detected voltage, for example, at the analog input terminal AD2 and unillustrated another analog input terminal is suppressed.

If the sneak current via the transistor Tr2, the resistor R4, the diode D3, the INT switch SW3 in the ON-state, the variable resistor VR and the resistor R10 exceeds 5 V, the diode D6 is turned on. Then, the above sneak voltage is divided by the resistors R16 and R10 to fall to or below 5 V and, hence, the application of a voltage exceeding the maximum rated voltage to the analog input terminal AD2 is suppressed, with the result that a malfunction such as an error in a detected voltage, for example, at the analog input terminal AD1 and unillustrated another analog input terminal is suppressed.

Further, in the wiper control circuit 1 shown in FIG. 1, a current flowing into the variable resistor VR when the transistor Tr1 and the relay switch 3 are on changes according to a forward voltage of the diode D1. Since the forward voltage of the diode D1 changes according to temperature and the variation of the diode D1, the current flowing into the variable resistor VR also changes according to temperature and the variation of the diode D1. As a result, a voltage inputted to the analog input terminal AD2, i.e. a voltage value indicating the interrupt time of the wiper and generated according to the resistance value of the variable resistor VR, also changes according to temperature and the variation of the diode D1.

However, the microcomputer 4 can obtain an anode voltage of the diode D1 by means of the analog input terminal AD1. Accordingly, the microcomputer 4 calculates a difference between the voltage inputted to the analog input value AD2 and the one inputted to the analog input terminal AD1 to obtain the forward voltage of the diode D1, and corrects the resistance value of the variable resistor VR obtained from the voltage value inputted to the analog input terminal AD2 using the thus obtained forward voltage of the diode D1.

Specifically, if $V_{AD1}$ denotes the voltage inputted to the analog input terminal AD1, $V_{AD2}$ the voltage inputted to the analog input terminal AD2, $R_{VR}$ the resistance value of the variable resistor VR, $R_1$ the resistance value of the resistor $R_1$, $V_2$ the second power supply voltage outputted from the control power supply circuit PS (5 V in the example shown in FIG. 1) and $V_{CE}$ an collector-emitter voltage of the transistor Tr1, a relationship of these is expressed by the following equation.

$$V_{AD2} = \{R_{VR}/(R_1+R_{VR})\} \times [V_2 - \{V_{CE}+(V_{AD1}-V_{AD2})\}]$$

By transforming this equation, the following equation (1) to give the resistance value $R_{VR}$ indicating the interrupt time of the wiper can be obtained.

$$R_{VR}=R_1/[[[V_2-\{V_{CE}+(V_{AD1}-V_{AD2})\}]/V_{AD2}]-1] \quad (1)$$

Here, if a base current of the transistor Tr1 is set to a current value sufficient to turn the transistor Tr1 on, a change of the collector-emitter voltage $V_{CE}$ caused by temperature becomes small. Thus, in the above equation (1), the collector-emitter voltage $V_{CE}$ can be approximately treated as a constant value.

Further, from the equation (1), the resistance value $R_{VR}$ of the variable resistor VR can be obtained based on the voltages $V_{AD1}$, $V_{AD2}$ without being influenced by the forward voltage of the diode D1.

The voltage inputted to the analog input terminal AD1 may be obtained as a voltage value indicating the interrupt time of the wiper, and the resistance value $R_{VR}$ indicating the interrupt time of the wiper may be calculated by calculating the forward voltage of the diode D1 using the voltage inputted to the analog input terminal AD2.

In this case, the relationship expressed by the following equation holds.

$$V_{AD1}=\{R_{VR}/(R_1+R_{VR})\}\times[V_2-\{V_{CE}+(V_{AD1}-V_{AD2})\}]+(V_{AD1}-V_{AD2})$$

Further, the resistor R10, the capacitor C2, the overvoltage protecting circuit 5 and the analog input terminal AD2 may not be provided and the voltage inputted to the analog input terminal AD1 may be obtained as a voltage indicating the interrupt time of the wiper. In this case, the analog input terminal AD1 corresponds to the first voltage detecting portion.

If the input voltage to the analog input terminal AD2 is equal to or below the power supply voltage (5 V) supplied to the microcomputer 4, the overvoltage protecting circuit 5 may not be provided.

A wiper control circuit according to one aspect of the present invention is a wiper control circuit in which one end of a variable resistor whose resistance value changes according to an instruction to set an interrupt time for causing an interrupt operation of a wiper installed in a vehicle is connected to a ground via a switching element, an external circuit connected with an operation switch to be turned on and off in accordance with a specified operation instruction is connected to the one end of the variable resistor, and an instruction obtained by the variable resistor and the operation switch is received, the wiper control circuit comprising a first connection terminal for the connection to the other end of the variable resistor; a second connection terminal for the connection to the other end of the operation switch; a third connection terminal for receiving a first power supply voltage; a power supply for outputting a second power supply voltage lower than the first power supply voltage based on the first power supply voltage received by the third connection terminal; a first diode disposed between the first connection terminal and the power supply in a reverse direction when seen from the first connection terminal; a first voltage detecting portion for detecting an anode voltage of the first diode, the upper limit of whose permissible range of voltages to be detected is lower than the first power supply voltage; an operation instruction detecting voltage supplying portion for supplying the first power supply voltage received by the third connection terminal to the second connection terminal; and a second voltage detecting portion for detecting a terminal voltage of the second connection terminal.

According to this construction, the first power supply voltage is received by the third connection terminal and the second power supply voltage lower than the first power supply voltage is generated by the power supply. When the switching element connected to the one end of the variable resistor is turned on, a current flows into the first diode and the variable resistor based on the second power supply voltage and a voltage corresponding to a resistance value set for the variable resistor, i.e. a voltage indicating an instruction to set an interrupt time for causing an interrupt operation of the wiper installed in the vehicle, is detected by the first voltage detecting portion. A terminal voltage of the operation switch that changes based on the first power supply voltage as the operation switch is turned on and off is detected by the second voltage detecting portion, whereby the operation instruction indicated by the ON- or OFF-state of the operation switch is received by the second voltage detecting portion.

On the other hand, if the switching element is turned off to invalidate the states of the variable resistor and the operation switch, the variable resistor and the operation switch are shut off from the ground by the switching element, thereby invalidating the states of the variable resistor and the operation switch. In this case, since a current path from the third connection terminal to the power supply via the operation switch and the variable resistor is shut off by the first diode, a likelihood that a sneak current flows from the third connection terminal to the power supply, a voltage generated by this sneak current is detected by the first and second voltage detecting portions and, hence, an erroneous instruction is received can be reduced.

It is preferable to further comprise a third voltage detecting portion for detecting a terminal voltage of the first connection terminal.

According to this construction, since a forward voltage generated in the first diode can be obtained based on the voltage detected by the first voltage detecting portion and the one detected by the third voltage detecting portion, the voltage corresponding to the resistance value set for the variable resistor, i.e. the voltage indicating the instruction to set the interrupt time for causing the interrupt operation of the wiper installed in the vehicle, can be corrected based on the forward voltage generated in the first diode.

It is preferable to further comprise a controller for receiving either one of the anode voltage of the first diode detected by the first voltage detecting portion and the terminal voltage of the first connection terminal detected by the third voltage detecting portion as the instruction to set the interrupt time and correcting the interrupt time indicated by the voltage value received as the setting instruction based on a difference between the anode voltage and the terminal voltage.

According to this construction, either one of the anode voltage of the first diode detected by the first voltage detecting portion and the terminal voltage of the first connection terminal detected by the third voltage detecting portion that are voltages obtained according to the resistance value set for the variable resistor is received by the controller. Then, the interrupt time indicated by the voltage value received as the setting instruction is corrected by the controller based on the difference between the anode voltage of the first diode and the terminal voltage of the first connection terminal, i.e. the forward voltage of the first diode. Thus, even in the case of an error in the voltage obtained according to the resistance value set for the variable resistor due to the forward voltage of the first diode, it becomes possible to correct the resistance value obtained from the voltage and to reduce an error of the interrupt time indicated by the voltage value received as the setting instruction.

It is preferable that the second power supply voltage outputted from the power supply is supplied to the anode of the first diode via a transistor and a series resistor; and that the controller receives $V_{AD2}$ as the terminal voltage of the first connection terminal detected by the third voltage detecting portion as the setting instruction indicating the interrupt time and calculates a resistance value $R_{VR}$ as information indicating the interrupt time in accordance with the following equation (1) if $V_{AD1}$ denotes the anode voltage of the first diode detected by the first voltage detecting portion, $R_{VR}$ the resistance value of the variable resistor, $R_1$ a resistance value of the series resistor, $V_2$ the second power supply voltage and $V_{CE}$ a collector-emitter voltage of the transistor.

$$R_{VR}=R_1/[[[V_2-\{V_{CE}+(V_{AD1}-V_{AD2})\}]/V_{AD2}]-1] \quad (1)$$

According to this construction, an error component caused by the forward voltage of the first diode can be eliminated and the resistance value of the variable resistor obtained from the voltage value received as the setting instruction, i.e. the information indicating the interrupt time can be corrected in accordance with the equation (1).

It is preferable to further comprise an overvoltage protecting circuit for suppressing an increase of the voltage inputted to the third voltage detecting portion for the detection of the terminal voltage in excess of the second power supply voltage.

According to this construction, if the switching element is turned off in accordance with a switching control signal received by a control signal input terminal, the first power supply voltage appears as the terminal voltage of the variable resistor by a path from the third connection terminal to the variable resistor via the operation switch, but an increase of the voltage inputted to the third voltage detecting portion in excess of the second power supply voltage is suppressed by the overvoltage protecting circuit, wherefore a likelihood of a malfunction caused by the application of a voltage exceeding the second power supply voltage to the third voltage detecting portion can be reduced.

It is preferable that the overvoltage protecting circuit includes a second diode having an anode connected to an output terminal of the power supply and a cathode connected to the ground via a resistor, a third diode having a cathode connected to the cathode of the second diode and an anode connected to an input terminal of the third voltage detecting portion for the input voltage and a second resistor disposed between the anode of the third diode and the first connection terminal; and that resistance values of the first and second resistors are set such that a voltage obtained in the case of dividing the first power supply voltage by the first and second resistors is equal to or below the second power supply voltage.

According to this construction, a voltage substantially equal to the second power supply voltage outputted from the power supply is applied to the cathode of the third diode by the second diode and the first resistor. If the voltage at the input terminal of the third voltage detecting portion exceeds the second power supply voltage, the third diode is turned on and the voltage divided by the first and second resistors is applied to the input terminal of the third voltage detecting portion. Then, an increase of the voltage inputted to the third voltage detecting portion in excess of the second power supply voltage can be suppressed since the resistance values of the first and second resistors are set such that the voltage divided by the first and second resistors is equal to or below the second power supply voltage.

It is preferable to further comprises the variable resistor, the operation switch, the switching element and an engine starting device for turning the switching element off upon starting an engine of the vehicle.

According to this construction, upon starting the engine of the vehicle, the switching element is turned off to shut off the operation switch from the ground. As a result, no current flows into the operation switch even if the operation switch is turned on, wherefore a likelihood of an unnecessary operation in accordance with the state of the operation switch at the time of starting the engine can be reduced.

What is claimed is:

1. A wiper control circuit, comprising:
   a first connection terminal for connecting one end of a variable resistor to a ground via a switching element, the other end of the variable resistor in an external circuit being connected to one end of an operation switch to be turned on and off in accordance with a specified operation instruction, wherein a resistance value of the variable resistor changes according to an instruction to set an interrupt time for causing an interrupt operation of a wiper installed in a vehicle,
   a second connection terminal for the connection to the other end of the operation switch;
   a third connection terminal for receiving a first power supply voltage;
   a power supply for outputting a second power supply voltage lower than the first power supply voltage based on the first power supply voltage received by the third connection terminal;
   a first diode disposed between the first connection terminal and the power supply in a reverse direction when seen from the first connection terminal;
   a first voltage detecting portion for detecting an anode voltage of the first diode, the upper limit of whose permissible range of voltages to be detected is lower than the first power supply voltage;
   an operation instruction detecting voltage supplying portion for supplying the first power supply voltage received by the third connection terminal to the second connection terminal; and
   a second voltage detecting portion for detecting a terminal voltage of the second connection terminal.

2. A wiper control circuit according to claim 1, further comprising a third voltage detecting portion for detecting a terminal voltage of the first connection terminal.

3. A wiper control circuit according to claim 2, further comprising a controller for receiving either one of the anode voltage of the first diode detected by the first voltage detecting portion and the terminal voltage of the first connection terminal detected by the third voltage detecting portion as the instruction for setting the interrupt time and correcting the interrupt time indicated by the voltage value received as the setting instruction based on a difference between the anode voltage and the terminal voltage.

4. A wiper control circuit according to claim 3, wherein:
   the second power supply voltage outputted from the power supply is supplied to the anode of the first diode via a transistor and a series resistor; and
   the controller receives $V_{AD2}$ as the terminal voltage of the first connection terminal detected by the third voltage detecting portion as the setting instruction indicating the interrupt time and calculates a resistance value $R_{VR}$ as information indicating the interrupt time in accordance with the following equation (1) if $V_{AD1}$ denotes the anode voltage of the first diode detected by the first voltage detecting portion, $R_{VR}$ the resistance value of the variable resistor, $R_1$ a resistance value of the series resistor, $V_2$ the second power supply voltage and $V_{CE}$ a collector-emitter voltage of the transistor:

$$R_{VR} = R_1/[[[V_2-\{V_{CE}+(V_{AD1}-V_{AD2})\}]/V_{AD2}]-1] \quad (1).$$

5. A wiper control circuit according to claim 4, further comprising an overvoltage protecting circuit for suppressing an increase of the voltage inputted to the third voltage detecting portion for the detection of the terminal voltage in excess of the second power supply voltage.

6. A wiper control circuit according to claim 5, wherein:
the overvoltage protecting circuit includes a second diode having an anode connected to an output terminal of the power supply and a cathode connected to the ground via a resistor, a third diode having a cathode connected to the cathode of the second diode and an anode connected to an input terminal of the third voltage detecting portion for the input voltage and a second resistor disposed between the anode of the third diode and the first connection terminal; and
resistance values of the first and second resistors are set such that a voltage obtained in the case of dividing the first power supply voltage by the first and second resistors is equal to or below the second power supply voltage.

7. A wiper control circuit according to further comprising:
the variable resistor,
the operation switch,
the switching element, and
an engine starting device for turning the switching element off upon starting an engine of the vehicle.

8. A wiper control circuit according to claim 1, further comprising:
the variable resistor,
the operation switch,
the switching element, and
an engine starting device for turning the switching element off upon starting an engine of the vehicle.

9. A wiper control circuit according to claim 2, further comprising an overvoltage protecting circuit for suppressing an increase of the voltage inputted to the third voltage detecting portion for the detection of the terminal voltage in excess of the second power supply voltage.

10. A wiper control circuit according to claim 9, wherein:
the overvoltage protecting circuit includes a second diode having an anode connected to an output terminal of the power supply and a cathode connected to the ground via a resistor, a third diode having a cathode connected to the cathode of the second diode and an anode connected to an input terminal of the third voltage detecting portion for the input voltage and a second resistor disposed between the anode of the third diode and the first connection terminal; and
resistance values of the first and second resistors are set such that a voltage obtained in the case of dividing the first power supply voltage by the first and second resistors is equal to or below the second power supply voltage.

11. A wiper control circuit according to claim 3, further comprising an overvoltage protecting circuit for suppressing an increase of the voltage inputted to the third voltage detecting portion for the detection of the terminal voltage in excess of the second power supply voltage.

12. A wiper control circuit according to claim 11, wherein:
the overvoltage protecting circuit includes a second diode having an anode connected to an output terminal of the power supply and a cathode connected to the ground via a resistor, a third diode having a cathode connected to the cathode of the second diode and an anode connected to an input terminal of the third voltage detecting portion for the input voltage and a second resistor disposed between the anode of the third diode and the first connection terminal; and
resistance values of the first and second resistors are set such that a voltage obtained in the case of dividing the first power supply voltage by the first and second resistors is equal to or below the second power supply voltage.

13. A wiper control circuit according to claim 4, further comprising:
the variable resistor,
the operation switch,
the switching element, and
an engine starting device for turning the switching element off upon starting an engine of the vehicle.

* * * * *